United States Patent [19]
Doolin et al.

[11] Patent Number: 5,174,677
[45] Date of Patent: Dec. 29, 1992

[54] MAIN ROTOR PITCH CONTROL ROD ASSEMBLY WITH PASSIVE LOCKING FEATURE

[75] Inventors: Leonard J. Doolin, Southbury; Stephen V. Poulin, Stratford, both of Conn.

[73] Assignee: The United States of America as represented by the Department of the Army, Washington, D.C.

[21] Appl. No.: 752,722

[22] Filed: Aug. 30, 1991

[51] Int. Cl.⁵ .............................................. F16D 1/00
[52] U.S. Cl. ...................................... 403/24; 403/46; 403/43
[58] Field of Search ....................... 403/46, 44, 43, 45, 403/47, 48, 24

[56] References Cited

U.S. PATENT DOCUMENTS

| | | | |
|---|---|---|---|
| 1,039,017 | 9/1912 | Bonness | 403/46 X |
| 1,347,963 | 4/1921 | Stevenson | 403/44 |
| 2,810,595 | 10/1957 | Purdy | 403/46 |
| 2,920,912 | 1/1960 | Hess | 403/46 |
| 3,239,930 | 3/1966 | Violleau | 403/46 X |
| 3,786,695 | 1/1974 | Barrett | 403/43 X |
| 4,012,967 | 3/1977 | Warren | 403/43 X |
| 4,418,583 | 12/1983 | Taig | 403/46 X |

Primary Examiner—Andrew V. Kundrat
Attorney, Agent, or Firm—John H. Lamming; Arthur H. Tischer

[57] ABSTRACT

Main rotor pitch control rod assemblies on helicopters constitute means for translating an aviator's control impulses in the cockpit to the main rotor blades. Pitch control rod assemblies typically include means for locking the assembly into a predetermined attitude setting. The setting may be held by locking nuts. This invention provides a passive locking means using spring tension to maintain the desired setting if the locking nuts loosen due to stress loads or improper torquing during maintenance. The invention also provides passive means for maintaining expansive stress within the control rod to prevent distortion of the assembly under compressive loads.

8 Claims, 2 Drawing Sheets

MAIN ROTOR PITCH CONTROL ROD ASSEMBLY WITH PASSIVE LOCKING FEATURE

BACKGROUND OF THE INVENTION

Altitude is one of four degrees of freedom available to rotary wing aircraft. In helicopters, altitude is regulated by controlling the collective pitch of the main rotor blades. Collective pitch refers to the angle at which an airfoil (i.e. a main rotor blade) passes through the air. This angle may be called the "angle of attack"; it is measured between the chord of the airfoil and the direction of the relative wind. By changing the collective pitch, an aviator adjusts the vertical lift and resultant altitude of the aircraft. Minimal collective pitch is used when hovering flight is desired at a given resultant altitude. Changes in collective pitch may be accompanied by automatic or manual adjustments in engine power and cyclic pitch so as to maintain normal engine rpm, to control rates of vertical climb and horizontal flight, to correct dissymmetry of lift in forward flight, and to avoid stalling.

While the precise details of individual systems may vary in their particular components and design characteristics, main rotor blade assemblies typically include pitch control rod assemblies. The control rod assemblies constitute means for translating control impulses from the aviator's movement of the collective and cyclic pitch control levers in the cock pit of the aircraft. Servomechanical power is typically used to provide the mechanical force required for rotating the control rods and adjusting the pitch or angle of attach of each main rotor blade.

The main rotor blades must rotate at high speeds, with tip speeds often in excess of 400 miles per hour, to generate sufficient lift to elevate the aircraft off the ground and to the desired altitude. The blade assemblies, including the pitch control rod assemblies, are subjected to large loads even in routine operations. The loads include high frequency harmonic motion from vibrational resonance, lead-lag oscillations and flapping, turbulence from airflow patterns and Coriolis forces, resultant lift and induced drag.

Because of the loads on the main rotor shaft, blades, and components of their constituent assemblies, maintenance is often a challenge and durability and reliability are abiding concerns. This applies to the pitch control rod assemblies as well as to other components of the main rotor system. The loads that the main rotor system are subject to can adversely affect the pitch control mechanism by allowing the control rods to elongate, thus forcing the rotor blades out of their track. Alternatively, the rotor blades may be free to rotate on the rod axis, unable to hold a pitch setting. A malfunction of either type could threaten the airworthiness of the craft so affected. In turn, mission effectiveness would be jeopardized and the aircraft and crew would be placed at risk in that field repair of such malfunctions would probably be difficult at best and practically impossible in most commonly encountered circumstances.

The present state of the art relating to pitch control rod assemblies encompasses two typical means of safeguarding against the type of mechanical malfunction alluded to above. To fully understand the nature of these safety means, it will be necessary to describe briefly the components and structure of a typical pitch control rod assembly. It is to such an assembly that the improvement provided by the instant invention, described in detail below, applies. Basically, a pitch control rod assembly comprises a barrel which is castellated at one end and two rod ends with elastomeric bearings which threadably engage the inside surface of the barrel ends. Once installed, the rod ends are oppositely displaced to one another. The distance between the center line of the rod ends may be adjusted by turning the barrel; when the desired distance is reached, jam nuts which threadably engage the outside surface of the rod ends are used to lock the adjusted positions of the rod ends. The castellated end of the barrel is machined to provide incremental adjustment notches for changing the center line distance between rod ends in relation to the barrel. A locking kay fits into a notch to hold a predetermined setting; the torque applied to tightening the jam nut holds the key in its designated notch. Adjustment of control rod length is made to provide for the most appropriate rotor blade track and balance. If torque on the jam nut loosens, say as a result of vibratory stress of maintenance error, the key disengages from the notch into which it has been placed for the desired adjustment and the rod is free to rotate and is unable to hold a pitch setting. The free twisting of the rod end when the jam nuts loosen also permits changes in control rod length which results in the rotor blade leaving its track.

This typical pitch control rod assembly of the prior art lacks a passive safety feature to guard against the hazards posed by loosening jam nuts or by jam nuts that have not been properly retorqued after control rod length setting or adjustment. Having passing locking redundancy in the assembly would ensure the structural integrity of the assembly. This invention provides an improvement to the combination pitch control rod assembly of the prior art by adding means to passively engage the locking key in its groove in the event that a locking jam nut loosens in flight or has not been properly torqued into place during routine service or repair.

In another of its aspects, the invention pertains to preload spring means for keeping the control rod barrel in tension even under compressive loads in order to prevent load reversal resulting from loose jam nuts. Such load or stress reversals can result in premature fatigue failures.

SUMMARY AND OBJECTS OF THE INVENTION

This invention is directed toward a passive locking feature for the main rotor pitch control rods. In another aspect, the invention is directed toward a passive expansive load feature to increase control rod service life. The two features enhance helicopter flight safety and the durability and reliability of pitch control rods. The features may be used simultaneously or, if desired, one may be used to the exclusion of the other. In one aspect, the invention provides a spring means to hold a locking key in position of engagement with a groove of the castellated end of the control rod barrel even if the jam nut locking system fails. In its other aspect, the invention provides an expansive load spring means to maintain expansive tension within the rod barrel in the event that the jam nut locking means fail so as to reduce stress on the threaded rod ends and prevent premature fatigue failure.

Therefore, it is a primary object of the invention to enhance helicopter flight safety introducing novel safety features relating to main rotor blade pitch control rod assemblies.

It is an object of the invention to provide flight safety features to reduce or eliminate hazards resulting from certain malfunctions or failures in pitch control rod components.

It is a further object of the invention to provide a passive redundant locking feature to prevent loss of rotor blade pitch and tracking control in the event of certain malfunctions or failures of pitch control rod assembly components.

Still a further object of the invention is to provide a means for reducing or eliminating pitch control rod component fatigue stress in the event of certain malfunctions or failures in control rod components.

DESCRIPTION OF THE SPECIFIC EMBODIMENTS

The helicopter is a highly complex dynamic machine. Its routine operation subjects the airframe and the moving components to large loads or stresses which threaten the structural integrity and airworthiness of the aircraft. In response to these challenges, means have been developed to dampen or compensate for some stresses and in so doing to make helicopter flight somewhat safer. The need still exists for safety measures to prevent or make less likely certain malfunctions of pitch control rods assemblies which comprise a subsystem of the main rotor assembly on helicopters. The present invention addresses this need by providing passive locking means to maintain rod ends in their set positions even after locking jam nuts have loosened and by providing alternative preload spring means to help avoid load or stress reversals after jam nut loosenings which may cause fatigue failures in control rod components.

Figure 1:
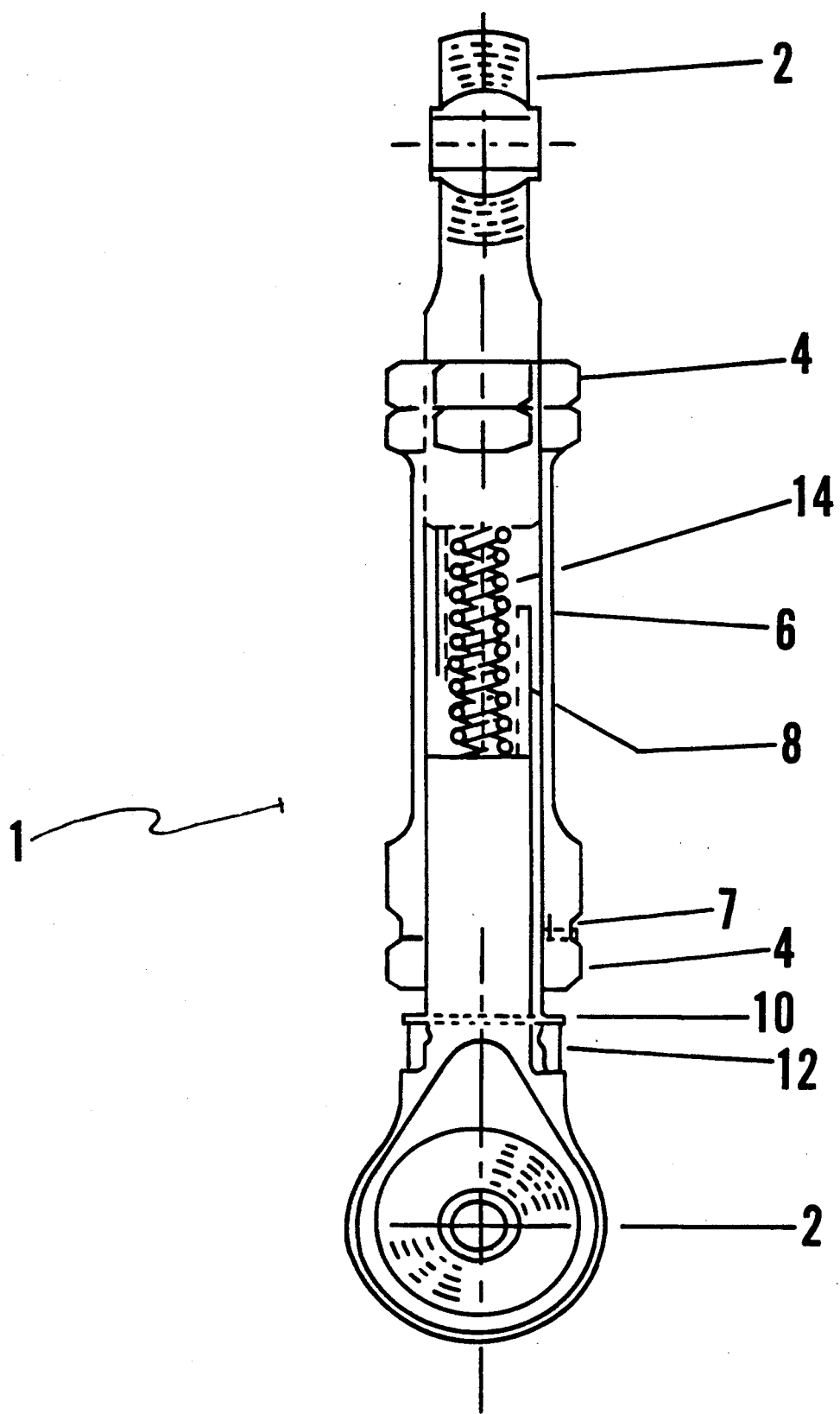
FIG. 1 shows a pitch control rod assembly with passive locking spring means and preload spring means of the invention.

The improvements to existing pitch control rod assemblies provided by the instant invention will now be described in detail having reference to the drawings. FIG. 1 is a cut-away profile view of a pitch control rod assembly 1. In this view, rod ends 2 fashioned of metal, such as titanium, and bearings made of an elastomer or teflon coated material, are threadably engaged with the inside surface of the control rod barrel 6 also fashioned of a metal such as titanium. The rod ends have tang members 8 that interlock. The rod ends engage the barrel by reverse thread means inside the barrel. The rod barrel is a hollow tube the wall of which has inside threaded and outside hex surfaces. The control rod barrel 6 is castellated at one end. Jam nuts 4 are threadably engaged to the outer surface of the rod ends 2 and are torqued into place to fix the rod ends 2 and the barrel 6 into positions relative to each other. One jam nut is needed on each end of the barrel tube 6 as it can be torqued against the flared hex shaped surface of that end. The locking key 10 on the end engages the castellations in the barrel and a slot in the rod end. A unique feature of this invention is that the locking key 10 is spring loaded by coil spring means 12, ensuring that the key is engaged in a castellation of one end of the barrel 6 and a slot of the rod end 2. The spring means 12 provide a passive locking feature if the jam nuts are either not properly torqued after control rod adjustments are made by a mechanic, or if the jam nuts work loose. The jam nuts 4 and the locking key 10 provide two independent locking features which together eliminate the need for lockwire or cotter pins. Another unique feature of the invention is that preload spring means 14 may be used to maintain tension between the threads of the rod ends and barrel 6, even under compressive loads, to prevent load or stress reversal on the threads which engage the jam nuts 4 with the inside surface of each barrel end in the event that a jam nut works loose or is not properly retorqued after control rod adjustment or other maintenance.

Figure 2:
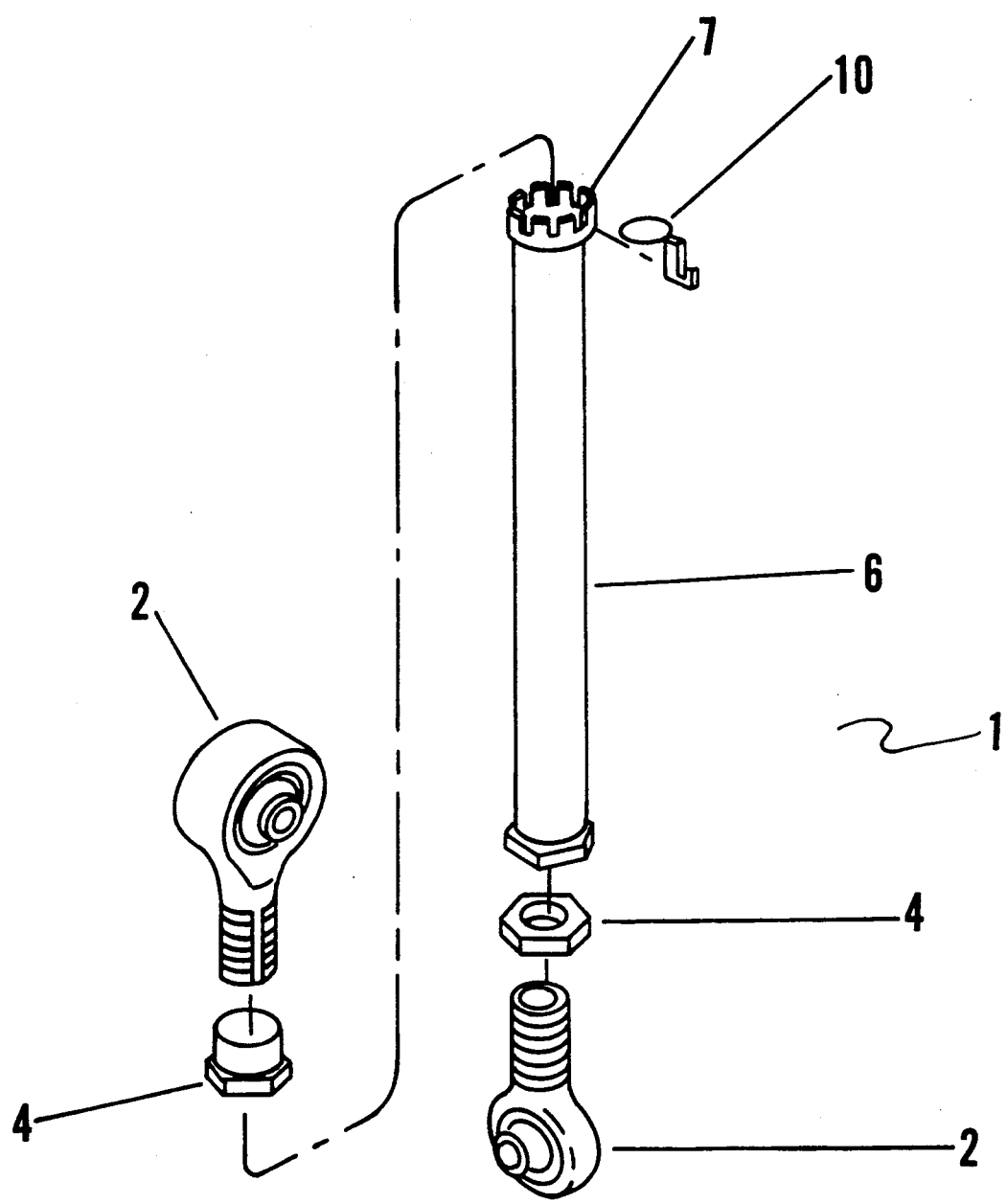
FIG. 2 is an exploded view of a pitch control rod assembly with passive lock spring means of the invention.

FIG. 2 shows some additional details of the collective pitch control rod assembly 1 to which the improvements of this invention pertain. The castellated end 7 of the rod barrel 6 is shown. This end 7 typically is flared outward from the flush surface of the rest of the tube 6. A locking key 10 which has a ring integral with the key for engaging the passive locking spring means 12 is shown in this view of the rod assembly 1. FIG. 1 also shows the locking key 10 with an integral ring portion that is in engagement with the passive spring means 12.

It is contemplated that the passive locking spring means 12 and the preload spring means 14 may be used alone or in combination with each other. It is preferred that they be used in combination. It is also contemplated that various locking kay 10 configurations may be used to fit the particular design requirements of individual control rod assembly styles and types. Several embodiments of the preload spring means 14 are possible. For example, to maintain expansive tension in the rod barrel 6, a coil spring may be used. The ends of the spring will push on the rod end 2 portion which is threadably engaged with the inside surface of the barrel 6 at both ends of the barrel. Other embodiments of the preload spring means 14 of this invention include a Bellville washer stack, compressed elastomer, or bladder filled to desired pressure with compressed air. Coil spring means are the preferred embodiment of this invention.

It is clear from the foregoing that some modifications and variations on the specific embodiments and examples set forth above to illustrate the improvements of this invention are possible and that the same will occur to skilled practitioners in the art to which the invention pertains. Unless explicitly limited by the claims which follow, such modifications and variations are deemed to be within the spirit and therefore the letter and the scope of the instant invention.

What is claimed is:

1. A helicopter main rotor pitch control rod assembly with passive locking and expansive load safety features, comprising:
    (a) rod barrel tube having castellations at one end and having threads at both ends on its inside surface;
    (b) metallic rod ends which include bearing means, cylindrical end member having threads to engage the threads on the inside surface at both ends of the rod barrel tube, and interlocking tang members;
    (c) at least two jam nuts for fixing the rod ends and the barrel tube in position relative to each other by threadably engaging the outside surface of the rod ends;
    (d) a locking key to engage a castellation groove in one end of the rod barrel tube and a slot in the rod end;

(e) coil spring means to hold the locking key in position in a groove of the castellated end of the rod barrel tube and a slot of the rod end whether or not the jam nuts are tightened to proper torque.

2. The helicopter main rotor pitch control rod assembly of claim 1 wherein the bearing means of the metallic rod ends are made of elastomer.

3. The helicopter main rotor pitch control rod assembly of claim 1 wherein the bearing means of the metallic rod ends are covered with a low-friction coating.

4. The helicopter main rotor pitch control rod assembly of claim 1 further comprising preload spring means inside the control rod barrel and mounted to push against the rod ends.

5. The helicopter main rotor pitch control rod assembly of claim 4 in which the preload spring means are comprised of a coil spring.

6. The helicopter main rotor pitch control rod assembly of claim 4 in which the preload spring means are comprised of a Bellville washer stack.

7. The helicopter main rotor pitch control rod assembly of claim 4 in which the preload spring means are comprised of a compressive elastomer.

8. The helicopter main rotor pitch control rod assembly of claim 4 in which the preload spring means are comprised of a bladder filled to a predetermined pressure with compressed air.

* * * * *

UNITED STATES PATENT AND TRADEMARK OFFICE
CERTIFICATE OF CORRECTION

PATENT NO. : 5,174,677
DATED : December 29, 1992
INVENTOR(S) : Leonard J. Doolin, et al.

It is certified that error appears in the above—identified patent and that said Letters Patent is hereby corrected as shown below:

In Column 1, Line 32, delete "attach" and insert therefor --attack--.

In Column 2, Line 14, delete "kay" and insert therefor --key--.

In Column 2, Line 32, delete "passing" and insert therefor --passive--.

In Column 4, Line 29, delete "kay" and insert therefor --key--.

Signed and Sealed this

Nineteenth Day of October, 1993

Attest:

BRUCE LEHMAN

*Attesting Officer*  *Commissioner of Patents and Trademarks*